US012730549B2

(12) United States Patent
Olowo et al.

(10) Patent No.: US 12,730,549 B2
(45) Date of Patent: Sep. 8, 2026

(54) INTERACTIVE NONLINEAR OPERATION SET NAVIGATOR

(71) Applicant: State Farm Mutual Automobile Insurance Company, Bloomington, IL (US)

(72) Inventors: Lookman Olowo, Bloomington, IL (US); Anirudh Gannarapu, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 385 days.

(21) Appl. No.: 18/495,949

(22) Filed: Oct. 27, 2023

(65) Prior Publication Data

US 2025/0138707 A1 May 1, 2025

(51) Int. Cl.
*G06F 3/0484* (2022.01)
*G06F 9/451* (2018.01)

(52) U.S. Cl.
CPC ............ *G06F 3/0484* (2013.01); *G06F 9/451* (2018.02)

(58) Field of Classification Search
CPC ............................... G06F 3/0484; G06F 9/451
See application file for complete search history.

(56) References Cited

U.S. PATENT DOCUMENTS

| | | | | |
|---|---|---|---|---|
| 5,850,221 | A * | 12/1998 | Macrae | G06F 8/34 715/965 |
| 12,079,567 | B1 * | 9/2024 | Bauer | H04L 51/046 |
| 2024/0037156 | A1 * | 2/2024 | Ryskamp | G06Q 10/103 |

* cited by examiner

*Primary Examiner* — Andrey Belousov
(74) *Attorney, Agent, or Firm* — Lee & Hayes, P.C.

(57) ABSTRACT

Described herein are systems and techniques to facilitate the efficient performance of operations and determination of operation states and related data. A set of operations and operation dependencies may be configured at an interactive nonlinear operation set navigator that may generate interface elements representing the operations and operation data. Operation interface elements may further include controls that, when activated, generate additional operation data and/or facilitate the initiation and completion of the represented operation. The duration and other properties associated with the execution of an operation may be tracked and used to generate alerts and perform other actions.

20 Claims, 8 Drawing Sheets

DETECT INITIATION OF OPERATION 402

INITIATE OPERATION TIMER 404

OPERATION SUCCESSFULLY COMPLETED? 406

NO

YES

TERMINATE TIMER, DETERMINE OPERATION DURATION 408

OPERATION DURATION MEET/EXCEED DURATION THRESHOLD(S)? 410

YES

TAKE ACTION(S) ASSOCIATED WITH MET/ EXCEEDED THRESHOLD(S) 412

NO

STORE OPERATION DURATION DATA 414

EXECUTE ONE OR MORE DURATION OPERATIONS BASED ON OPERATION DURATION DATA 416

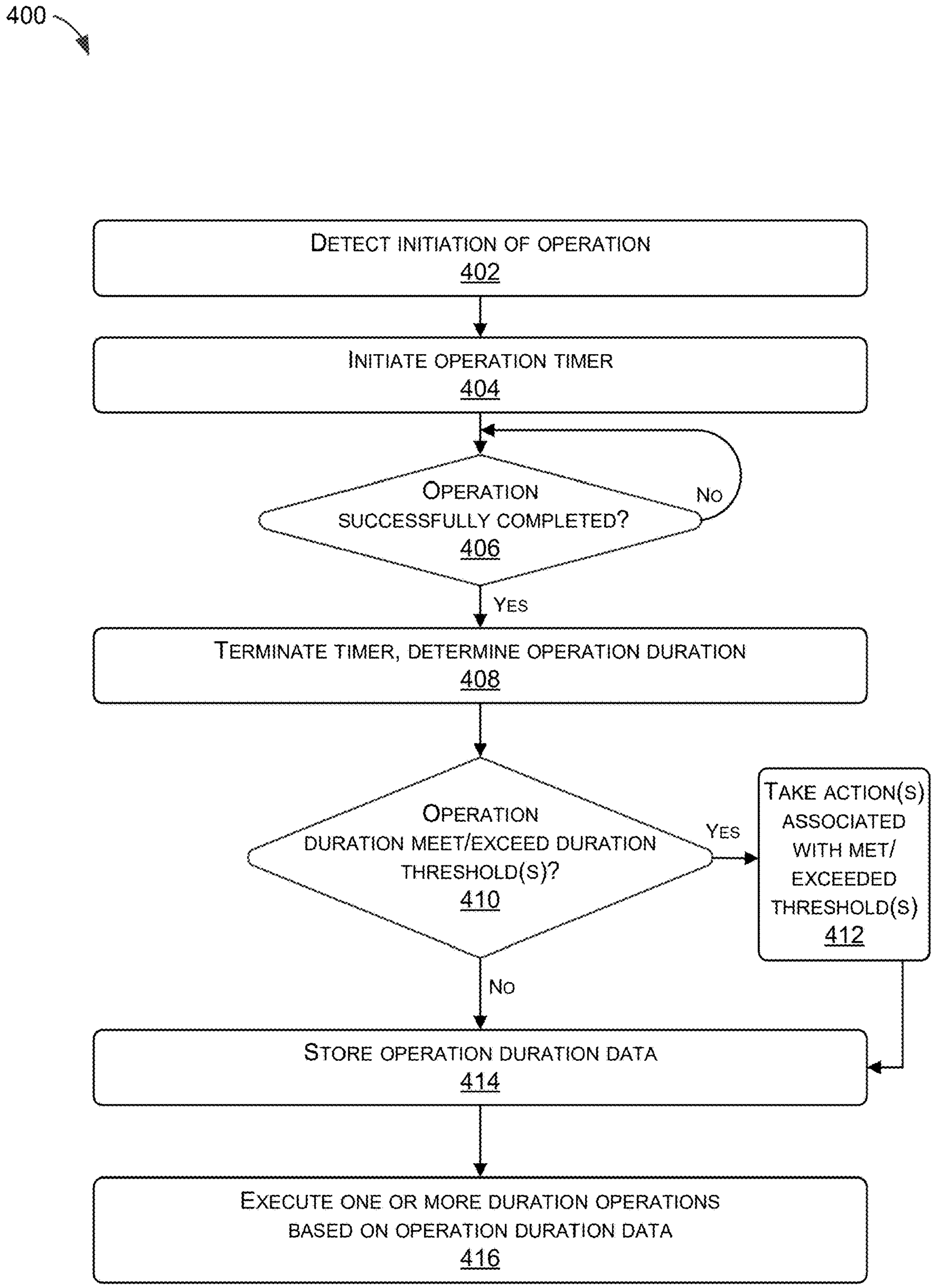

FIG. 4

INTERACTIVE NONLINEAR OPERATION SET NAVIGATOR

BACKGROUND

The implementation of significant technology projects, such as the implementation or migration of a complex data processing system, may involve many operations, some of which may be dependent upon other operations being successfully completed. There may be many users and many systems involved in the initialization, configuration, and modification operations required to complete such projects. Because of the large number of potentially involved users and systems, as well as the quantity of operations, tracking the status and interdependencies of operations in complex projects may be difficult. Moreover, determining whether resources are efficiently allocated to complete such operations in a complex project (e.g., based on operation duration, quantity of personnel, and/or amount and types of resources, etc. required to complete such operations) may be challenging because individual operations are difficult to assess within the larger context of a complex project. The examples of the present disclosure are directed to overcoming these deficiencies and providing a faster and more efficient means of increasing the efficiency of individual operation completions as well as tracking and increasing the performance of the systems and users involved in completing such operations.

SUMMARY

Techniques described herein implement an interactive nonlinear operation set navigation system that facilitates the presentation and nonlinear performance of operations within a set of operations to accomplish a computing resource goal. The interactive nonlinear operation set navigation system may determine operation states and dependencies and generate interface elements based on such information. These interface elements may be activated to generate other interfaces related to performing activities associated with the represented operation and/or to initiate execution of the operation (e.g., via computing resources instructions exchange via an application programming interface (API) at the resource). The duration of an operation may be tracked and used to determine one or more actions and/or determine more efficient users, teams, and/or staffing configurations. Operation state data and operation interface elements may be dynamically updated. Operations may be performed nonlinearly by multiple users; that is, operations that are eligible to be performed may be simultaneously executed and/or may have overlapping executions tracked by the interactive nonlinear operation set navigation system, which may update the data presented to all users interacting with an operation set navigation interface.

For example, the techniques described herein may relate to a method comprising generating, by a processor using an interface generation application executing on a user device, an operation set navigation interface comprising a plurality operation interface elements, wherein individual operation interface elements of the plurality operation interface elements correspond to individual operations of a plurality of computing resource operations and are configured to generate operation interfaces associated with the individual operations upon activation; detecting, by the processor via the interface generation application, a first activation of a first operation interface element of the plurality operation interface elements; generating, by the processor, in response to detecting the first activation, and based at least in part on a first memory state associated with the interface generation application, a first operation interface comprising an operation initiation control element configured to initiate an application programming interface (API) interaction with a computing resource, wherein the API interaction is based at least in part on a first operation corresponding to the first operation interface element; detecting, by the processor via the interface generation application, a second activation of the operation initiation control element; generating, by the processor, in response to detecting the second activation, and based at least in part on a second memory state associated with the interface generation application, a plurality of instructions based at least in part on the first operation; and transmitting, by the processor, the plurality of instructions to an API of the computing resource.

In examples, the first memory state associated with the interface generation application comprises an indication that the API interaction is eligible to be initiated. The indication that the API interaction is eligible to be initiated may be associated with the completion of one or more operations of the plurality of computing resource operations on which the first operation is dependent. In examples, the individual operation interface elements of the plurality operation interface elements comprise a visual, non-textual indication of one or more states of a corresponding individual operation of the plurality of computing resource operations. The one or more states comprise one or more of an operation completion state, an operation eligibility state, an operation recommendation state, or an operation dependency state. In examples, the method may further include storing an initiation time based at least in part on detecting the second activation; detecting a completion of the first operation; storing a termination time based at least in part on detecting the completion of the first operation; determining an operation duration time based at least in part on the initiation time and the termination time; and taking one or more actions based at least in part on the operation duration time. Taking the one or more actions may include determining that the operation duration time meets or exceeds a duration time threshold; and taking the one or more actions further based at least in part on determining that the operation duration time meets or exceeds the duration time threshold. Taking the one or more actions may also, or instead include determining a position of the operation duration time among a plurality of operation duration times associated with operation executions; and taking the one or more actions further based at least in part on the position of the operation duration time among the plurality of operation duration times. In examples, transmitting the plurality of instructions comprises transmitting one or more of an API key, a secret key, a username, or a password to the API of the computing resource.

In examples, a non-transitory computer-readable medium may include instructions that, when executed by one or more processors, cause the one or more processors to perform operations comprising: receiving, by a processor from an interface generation application executing on a user device, a first request for an operation set manipulation interface; transmitting, by the processor to the interface generation application, first instructions to generate the operation set manipulation interface, the first instructions comprising instructions to generate a plurality operation interface elements, wherein individual operation interface elements of the plurality operation interface elements correspond to individual operations of a plurality of computing resource operations and are configured to generate operation interfaces associated with the individual operations upon activation; detecting, by the processor via the interface generation application, a first activation of a first operation interface element of the plurality operation interface elements; transmitting, by the processor to the interface generation application, in response to detecting the first activation, and based at least in part on a first memory state received from the interface generation application, second instructions to generate a first operation interface comprising an operation initiation control element configured to initiate execution of an instruction set at a computing resource, wherein the instruction set is based at least in part on a first operation corresponding to the first operation interface element; detecting, by the processor via the interface generation application, a second activation of operation initiation control element; and transmitting, by the processor, in response to detecting the second activation, the instruction set to the computing resource.

In examples, the operations may further include detecting, by the processor, a selection of a first operation template; determining, by the processor, the instruction set based at least in part on the first operation template; and generating, by the processor, the first operation comprising the instruction set based at least in part on the first operation template. The operations may also, or instead, include detecting, by the processor, a modification of the first operation template; determining, by the processor, that the first operation was generated based at least in part on the first operation template; and modifying, by the processor, and based at least in part on determining that the first operation was generated based at least in part on the first operation template, the first operation. In further examples, the operations may also, or instead, include detecting, by the processor, a completion of the first operation; and transmitting, by the processor to the interface generation application, third instructions to generate the operation set manipulation interface, the third instructions comprising instructions to generate a second operation interface element corresponding to the first operation based at least in part on detecting the completion of the first operation. In examples, the second operation interface element is configured to generate, upon activation, an operation duration interface associated with the first operation. The operations may also, or instead, include updating, by the processor in a computer memory, based at least in part on detecting the completion of the first operation, a dependency state of a second operation; and transmitting, by the processor to the interface generation application, fourth instructions to generate the operation set manipulation interface, the fourth instructions comprising instructions to generate a third operation interface element corresponding to the second operation, the third operation interface element indicating the updated dependency state.

In examples, a system may include one or more processors; and a non-transitory memory storing computer-executable instructions that, when executed, cause the one or more processors to perform operations comprising: receiving, from an interface generation application executing on a user device, a first request for an operation set manipulation interface; transmitting, to the interface generation application, first instructions to generate the operation set manipulation interface, the first instructions comprising instructions to generate a plurality operation interface elements, wherein individual operation interface elements of the plurality operation interface elements correspond to individual operations of a plurality of computing resource operations and are configured to generate operation interfaces associated with the individual operations upon activation; detecting, via the interface generation application, a first activation of a first operation interface element of the plurality operation interface elements; transmitting, to the interface generation application, in response to detecting the first activation, and based at least in part on a first memory state received from the interface generation application, second instructions to generate a first operation interface comprising an operation initiation control element configured to initiate execution of an instruction set at a computing resource, wherein the instruction set is based at least in part on a first operation corresponding to the first operation interface element; detecting, via the interface generation application, a second activation of operation initiation control element; generating, in response to detecting the second activation, and based at least in part on a second memory state received from the interface generation application, a plurality of instructions based at least in part on the first operation; and transmitting the instruction set to the computing resource.

In examples, transmitting the instruction set to the computing resource comprises transmitting one or more instructions to an application programming interface (API) of the computing resource. The operations may also, or instead, include detecting a completion of the first operation; determining an operation duration time based at least in part on detecting the second activation and detecting the completion of the first operation; and taking one or more actions based at least in part on the operation duration time. The operations may also, or instead, include determining that the operation duration time meets or exceeds a duration time threshold; and taking the one or more actions further based at least in part on determining that the operation duration time meets or exceeds the duration time threshold.

The systems and techniques described herein may further relate to a system that may include means for receiving, from an interface generation application executing on a user device, a first request for an operation set manipulation interface; means for transmitting, to the interface generation application, first instructions to generate the operation set manipulation interface, the first instructions comprising instructions to generate a plurality operation interface elements, wherein individual operation interface elements of the plurality operation interface elements correspond to individual operations of a plurality of computing resource operations and are configured to generate operation interfaces associated with the individual operations upon activation; means for detecting, via the interface generation application, a first activation of a first operation interface element of the plurality operation interface elements; means for transmitting, to the interface generation application, in response to detecting the first activation, and based at least in part on a first memory state received from the interface generation application, second instructions to generate a first operation interface comprising an operation initiation control element configured to initiate execution of an instruction set at a computing resource, wherein the instruction set is based at least in part on a first operation corresponding to the first operation interface element; means for detecting, via the interface generation application, a second activation of operation initiation control element; means for generating, in response to detecting the second activation, and based at least in part on a second memory state received from the interface generation application, a plurality of instructions based at least in part on the first operation; and means for transmitting the instruction set to the computing resource.

BRIEF DESCRIPTION OF THE DRAWINGS

FIG. 4 is a flow diagram illustrating an example process for tracking operation duration, generating operation duration data, and executing one or more duration operations based on such data according to the examples of interactive nonlinear operation set navigation systems and methods described herein.

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the examples, as described herein. Like numbers refer to like elements throughout.

Figure 1:
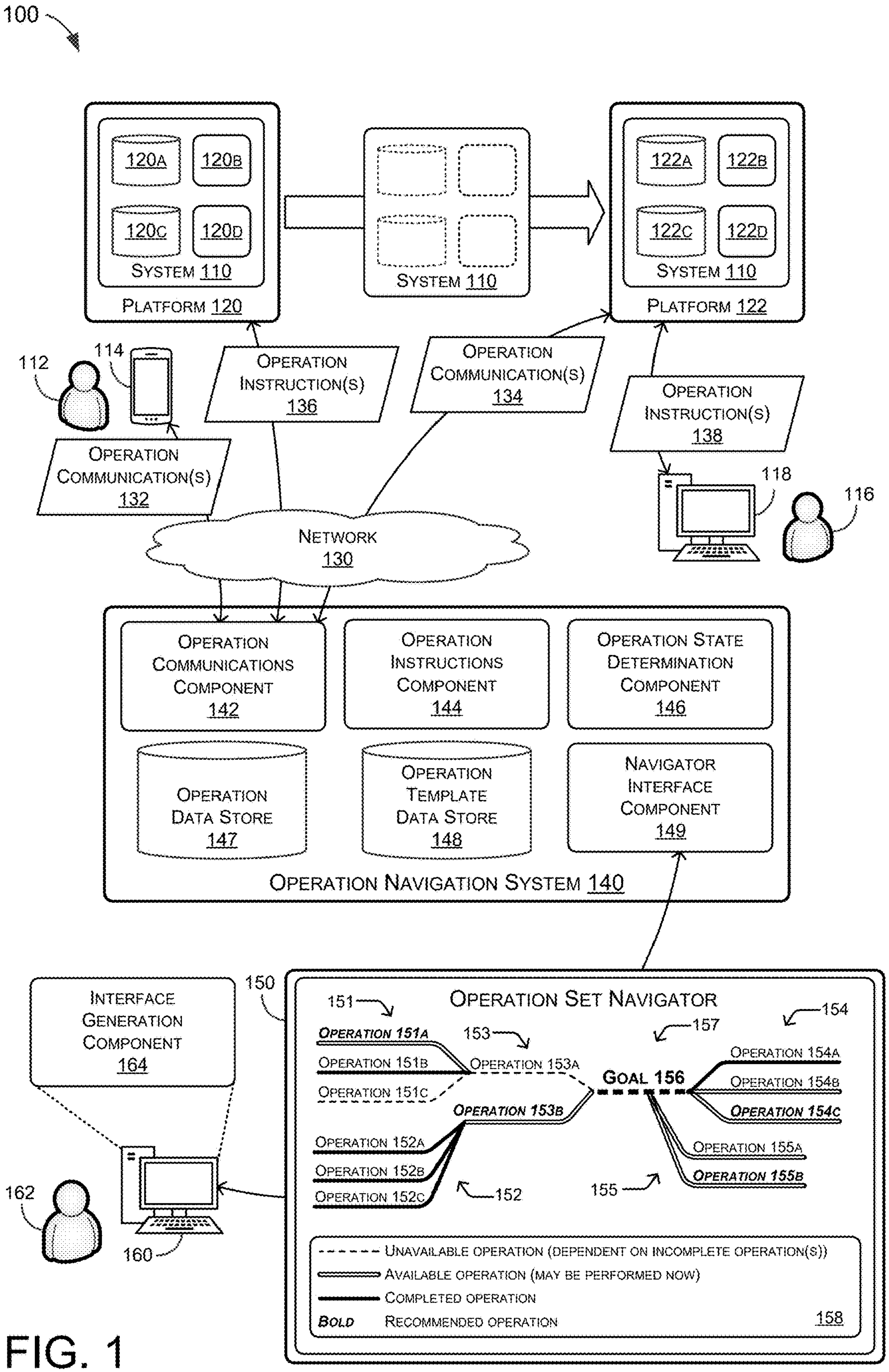
FIG. 1 illustrates an example environment in which interactive nonlinear operation set navigation systems and methods may be implemented.

FIG. 1 illustrates an environment 100 in which an interactive nonlinear operation set navigation system may be implemented according to examples of the instant disclosure. A system 110 may be implemented at a platform 120. The system 110 may be a system providing one or more of any type of computing services or applications. The platform 120 may be an environment configured to provide one or more computing resources, such as, but not limited to, one or more physical servers and/or other hardware located at a particular geographical location or a cloud-based computing resource provider. The platform 120 may provide computing resources including, without limitation, data storage resources, data processing resources (e.g., virtual machine (VM) instances), networking resources, data communication resources, network services, and/or other types of computing services and/or resources. The system 110 may be implemented at the platform 120 in one or more such resources provided by the platform 120. For example, the system 110 may include resources 120*a*, 120*b*, 120*c*, and/or 120*d*, each of which may be a physical and/or virtual resources provided at the platform 120. In examples, the platform 120 may include resources implemented on physical devices and/or systems located in a single geographical location or distributed across multiple geographical locations.

In order to implement the system 110 at the platform 120, one or more users may operate one or more computing devices to interact with resources of the platform 120. For example, a user 112 may operate a computing device 114 to configure or otherwise manipulate one or more resources at the platform 120 (e.g., one or more of resources 120*a*, 120*b*, 120*c*, and 120*d*) to implement and/or modify the system 110. A user 116 may also, or instead, operate a computing device 118 to configure or otherwise manipulate one or more resources at the platform 120 to implement and/or modify the system 110. For example, such users may operate computing devices to load 110 software and/or data (e.g., application software and/or data) for system 110 onto resources of the platform 120, configure application parameters for one or more applications included in system 110, modify such software, data, and/or parameters, etc. Such tasks may be referred to generally herein as "operations."

In examples, the system 110 may be migrated from the platform 120 to another platform, such as platform 122, which may be one or more physical servers and/or other hardware located at a particular geographical location or a cloud-based computing resource provider. This may be due to a change in provider, a need for different and/or improved computing resources available at the destination platform 122, etc. In particular examples, such a migration may be a migration from physical resources operated and maintained by a system operator to a cloud-based platform. The migration of the system 110 may include various operations (e.g., configuration and/or manipulation of various computing resources at the platforms). For example, one or more of the users 112 and 116 may operate one or more computing devices to configure resources at platform 122 (e.g., resources 122*a*, 122*b*, 122*c*, and/or 122*d*) to implement the system 110 at that platform. One or more of the users 112 and 116 may also, or instead, operate one or more computing devices to configure resources at platform 120 to cease execution and/or operation of the system 110 at that platform.

The one or more operations that may be performed to implement an application or service at a platform, to migrate an application or service from one platform to another platform, or to make one or more other changes, updates, modifications, etc. to an application or service executing on a platform, may be referred to as a "set of operations." A particular operation may include one or more activities. Such activities may include performing a modification to any aspect of an application or service; generating, deleting, modifying, transmitting, and/or receiving data of any type; documenting or otherwise memorializing any aspect of an operation or any activity associated therewith; and/or any other one or more actions that may be suitably associated with an operation. In examples, for an operation to be successfully completed, all activities of that operation must be successfully completed. Otherwise, the operation may be considered incomplete.

As described in more detail herein, a particular operation may be dependent upon another operation. For example, a first operation, such as storage of a dataset in a data store, may need to be completed before a second operation, such as an indexing of the dataset in the data store, can be initiated. On the other hand, the particular operation may be independent of other operations. For example, the second example operation of indexing the dataset in the data store may be independent of a third operation of loading a set of libraries onto a data processing resource.

In examples, activities of any particular operation may be performed by multiple users, devices, and/or systems. For example, different uses may perform different activities (e.g., using distinct computing devices) within an operation. Different users (e.g., using distinct computing devices) may also, or instead, perform different operations within a particular set of operations. Operations and activities may also be automated so that user interaction is not required. For example, a system, such as, but not limited to, the disclosed interactive nonlinear operation set navigation system, may detect the successful completion of a first activity within an operation and automatically initiate a second activity in response. Similarly, a system, such as, but not limited to, the disclosed interactive nonlinear operation set navigation system, may detect the successful completion of a first operation and automatically initiate a second operation (e.g., a first activity of the second operation) in response.

Operations and activities may be performed by direct (e.g., relatively direct, such as via one or more networks and/or via other electronic communications means outside of an interactive nonlinear operation set navigation system) interaction between a user's computing device and the computing resource being manipulated as part of an operation or activity. Alternatively or additionally, operations and activities may be performed via an interactive nonlinear operation set navigation system. Referring again to FIG. 1, the user 112 may operate the device 114 to transmit one or more operation communications 132 to the operation navigation system 140. As described in more detail herein, the operation navigation system 140 may generate and transmit one or more operation instructions 136 to platform 120 to perform one or more activities and/or operations on one or more computing resources provided by the platform 120. In another example, the user 116 may operate the device 118 to transmit one or more operation instructions 138 to the platform 122 to perform one or more activities and/or operations on one or more computing resources provided by the platform 122. The platform 122 may generate, transmit, and/or otherwise exchange one or more operation communications 134 with the operation navigation system 140 based on the instruction(s) 138 and/or the related operations and/or activities.

The electronic communications described herein may be facilitated by one or more networks of any type, represented by network 130. The network 130 may facilitate communications between devices 114 and 118, any of the resources of platforms 120 and 122, and/or the operation navigation system 140. The network 130 represents any number, type, and combination of wireless and/or wired networks that may be configured to facilitate communications between computing devices and/or systems. The network 130 may represent any communications means (e.g., any physical and/or logical communications connections) that allow components, systems, services, and/or devices of any type (e.g., physical and/or virtual) to interact with each other user. In examples, such interactions may be facilitated by application programming interfaces (APIs) configured at such components, etc.

The operation navigation system 140 may be configured to perform any one or more of the functions and/or operations associated with an interactive nonlinear operation set navigation system as described herein. In examples, the operation navigation system 140 may include an operation communications component 142 that may be configured to communicate with one or more resources, systems, and/or devices to acquire or otherwise determine operation and/or activity data. For example, the operation communications 132 and/or 134 may be detected by the operation communications component 142 and used to determine, by that component, that the associated operations and/or activities have been integrated, are in progress, completed, etc. Alternatively or additionally, the communications 132 and/or 134 may represent communications initiated by the operation communications component 142 querying one or more resources, systems, and/or devices for data that may be used to determine operation and/or activity data.

The operation navigation system 140 may also, or instead, include an operation instructions component 144 that may be configured to determine, generate, and/or transmit instructions (e.g., via API) to one or more resources, systems, and/or devices to perform one or more operations and/or activities. For example, the operation instruction(s) 136 may be generated by the operation instructions component 144 (e.g., in response to the operation communication(s) 132) and transmitted to the platform 120 (and/or one or more resources configured thereon) to request execution of an operation and/or activity. Alternatively or additionally, the operation instructions component 144 may generate instructions that may be provided to systems and devices for use with one or more other resources, systems, and/or devices. For example, the operation instructions component 144 may generate and transmit the operation instruction(s) 138 to the device 118, which may then transmit the operation instruction(s) 138 to the platform 122 (and/or one or more resources configured thereon) to request execution of an operation and/or activity.

The operation navigation system 140 may also, or instead, include an operation state determination component 146 that may be configured to determine, update, and/or maintain state data for operations. An operation state may include, but is not limited to, one or more of a state of completion (e.g., incomplete, complete), a state of eligibility (e.g., eligible to be executed or performed, ineligible to be executed or performed), a state of recommendation (e.g., recommended to be performed (e.g., next), not recommended to be performed, no recommendation), and a state of dependency (e.g., an indication of one or more operations on which this operation depends, an indication of one or more operations dependent upon this operation). For example, the operation state determination component 146 may determine, based on the operation communication(s) 132 and/or 134 (e.g., received via the operation communications component 142), a state of the operations associated with such communications and/or other state data. An operation state may be, for example, initiated, in progress, on hold, successfully completed, terminated, unsuccessful, etc. Operation state data may indicate a particular set of operations with which a state may be associated. Operation state data may indicate an operation template on which the operation is based (e.g., as described in more detail below). Operation state data may also, or instead, include time data that indicates a start time and an end time (if applicable) for an operation and/or activity, as well as a duration. Operation state data may further include user, user device, operator, and/or operator device information. Operation state data may also, or instead, include any other data that may be associated with a particular operation and/or one or more activities associated with a particular operation. Operation states and state data may be used to determine whether one or more dependent operations (e.g., operations dependent on the successful completion of the operation for which a state is evaluated) may proceed. The operation state determination component 146 may interact with an operation data store 147 to generate, store, update, modify, delete, and/or otherwise manipulate state data and/or other data for various operations. Such data may include activity data and/or operation data of any type. Such data may also, or instead, be stored, updated, modified, deleted, and/or otherwise manipulated by one or more other components, such as the operation communications component 142 and the operation instructions component 144.

The operation navigation system 140 may also, or instead, include a navigator interface component 149 that may be configured to interact with one or more user devices to generate and/or present a navigation interface, such as operation set navigator interface 150. For example, the navigator interface component 149 may receive, obtain, generate, and/or determine data associated with one or more operation sets, operations, and/or activities. The navigator interface component 149 may receive a request for such data and/or may otherwise determine to provide such data to an interface generation component of a user device, such as interface generation component 164 configured at device 160 operated by a user 162. The interface generation component may then use such data to generate and present (e.g., on a device display) a navigation interface, such as operation set navigator interface 150, that may allow a user to interact with, execute, initiate, or otherwise manipulate operations via operation interface elements presented on the navigation interface.

In examples, user 162 may be a user involved in or associated with completing operations in an operation set, like users 112 and/or 116 (in some examples, user 162 may be one of user 112 or user 116). User device 160 may also, or instead, be a user device used to implement operations in an operation set, like user devices 114 and/or 118 (in some examples, user device 160 may be one of user device 114 or user device 118).

The interface generation component 164 configured at user device 160 may be an application and/or service that is configured to communicate with the operation navigation system 140 and to generate and/or present interfaces on the user device 160. In some examples, the interface generation component 164 may be a browser application. The interface generation component 164 may have associated states and data that may be used in the generation of a navigation interface as described herein.

The operation set navigator interface 150 represents an exemplary navigation interface and data that may be associated therewith. The interface 150 includes interface elements representing an operation set 157. The operation set 157 may include various operations represented as operation interface elements in the interface 150. The dependency relationship between such operations may be visually (e.g., non-textually) depicted by the elements of the interface 150. The goal 156 of the operation set 157 may represent the ultimate goal of the operation set (e.g., implement an application or service, migrate an application or service, etc.).

For example, a group of operations 151 may include operations 151*a*, 151*b*, and 151*c* that may all need to be completed before dependent operation 153*a* of a group of operations 153 may be initiated. Similarly, the group of operations 153 may also include operation 153*b* that may depend on the completion of the group of operations 152 (including operations 152*a*, 152*b*, and 152*c*). The operation set 157 may further include a group of operations 154, including operations 154*a*, 154*b*, and 154*c*, and a group of operations 155, including operations 155*a* and 155*b*.

The operation interface elements represented in the interface 150 may represent associated operation states and state data visually (e.g., non-textually). Other data, properties, and/or attributes for operations and/or a set of operations may also, or instead, be represented visually (e.g., non-textually) in the interface 150. A key or legend 158 to such visual representations may be included in the interface 150. As shown here, particular operations may be represented as unavailable due to depending on operations that are not yet complete, available for current execution, and/or completed. Furthermore, particular operations may be recommended for performance next (e.g., among the associated group of operations). As can be seen here, because the exemplary system facilitates the nonlinear performance of operations, several operations may be available for current performance or execution, and several of those operations may currently be recommended as next operations to be performed or executed.

For example, as shown in the interface 150, in the group of operations 151, the operation 151*a* may currently be eligible to be performed, the operation 151*b* may be complete, and the operation 151*c* may currently be unavailable (e.g., due to dependence on some activity or operation that remains incomplete (not shown)). Among the group of operations 151, the operation 151*a* is emphasized as a currently recommended operation.

Continuing with the example of the interface 150, in the group of operations 152, all of the operations 152*a-c* may be completed. The group of operations 153 may include an operation 153*a* that is dependent on the completion of the group of operations 151 and therefore is not currently available for performance or execution, while an operation 153*b* of the group of operations 153 is currently available (and is also recommended) because that operation depends on the group of operations 152, all of which have been completed.

As noted, the nonlinear operation capabilities of the disclosed system allow for multiple operations to be available and performed or executed in a nonsequential manner. For example, as shown in exemplary interface 150, the group of operations 154 may include a completed operation 154*a* and two available operations 154*b* and 154*c*. While operation 154*c* may be recommended as the next operation to be performed among the group of operations 154, as can be seen here, both operations 154*b* and 154*c* may currently be performed. Similarly, the group of operations 155 may include two available operations 155*b* and 155*c* that may each be currently performed, with operation 155*b* being recommended as the next operation to be performed among the group of operations 155.

As described in more detail herein, each of the operation interface elements may represent a user-selectable control that may generate instructions and/or requests for additional data and/or to perform one or more actions. Such requests may be based on the state of the interface generation component 164. For example, if the interface generation component 164 is currently in a state associated with the presentation of operation interface elements of the operation set 157, an activation by a user of such an element may generate a request for data that may then be used, when received by the interface generation component 164, to generate an interface presenting information and/or including controls associated with that element.

User and/or operation activity may be detected and/or obtained by the operation navigation system 140 to update and/or generate other operation data that may be used for various purposes. For example, as described in more detail herein, visual operation interface elements may be modified so that representations on an interface may be updated to reflect operation states and dependencies. Operation durations and other temporal operation data may be determined to present relative operation data to a user. Access to documentation associated with an operation may be provided via activation of an operation interface element. Access to means of performing an operation and/or activities associated therewith may be provided or otherwise facilitated via activation of an operation interface element. These and other aspects of interactive nonlinear operation set navigation systems and techniques are described in more detail hereon.

By facilitating the nonlinear execution of operations while accurately determining and updating operation states and state data, the systems and techniques described herein facilitate the faster and more efficient implementation of the operations that may be required to complete complex and multifaceted sets of operations. The use of automated interface generation to provide resources and data to users involved in such complete sets of operations ensures that the appropriate resources are more quickly available so that operations may be more efficiently performed. Moreover, using the interactive nonlinear operation set navigation systems and techniques described herein may improve the performance of associated systems and operations by reducing or eliminating the need for manual searching to determine needed resources for an operation and manual tracking of operations, operations states, and operation dependencies. For example, the disclosed systems and techniques provide a faster and more efficient way to complete operations, track operation dependencies, and access operation-related resources compared to traditional techniques of collecting and processing such data.

Figure 2:
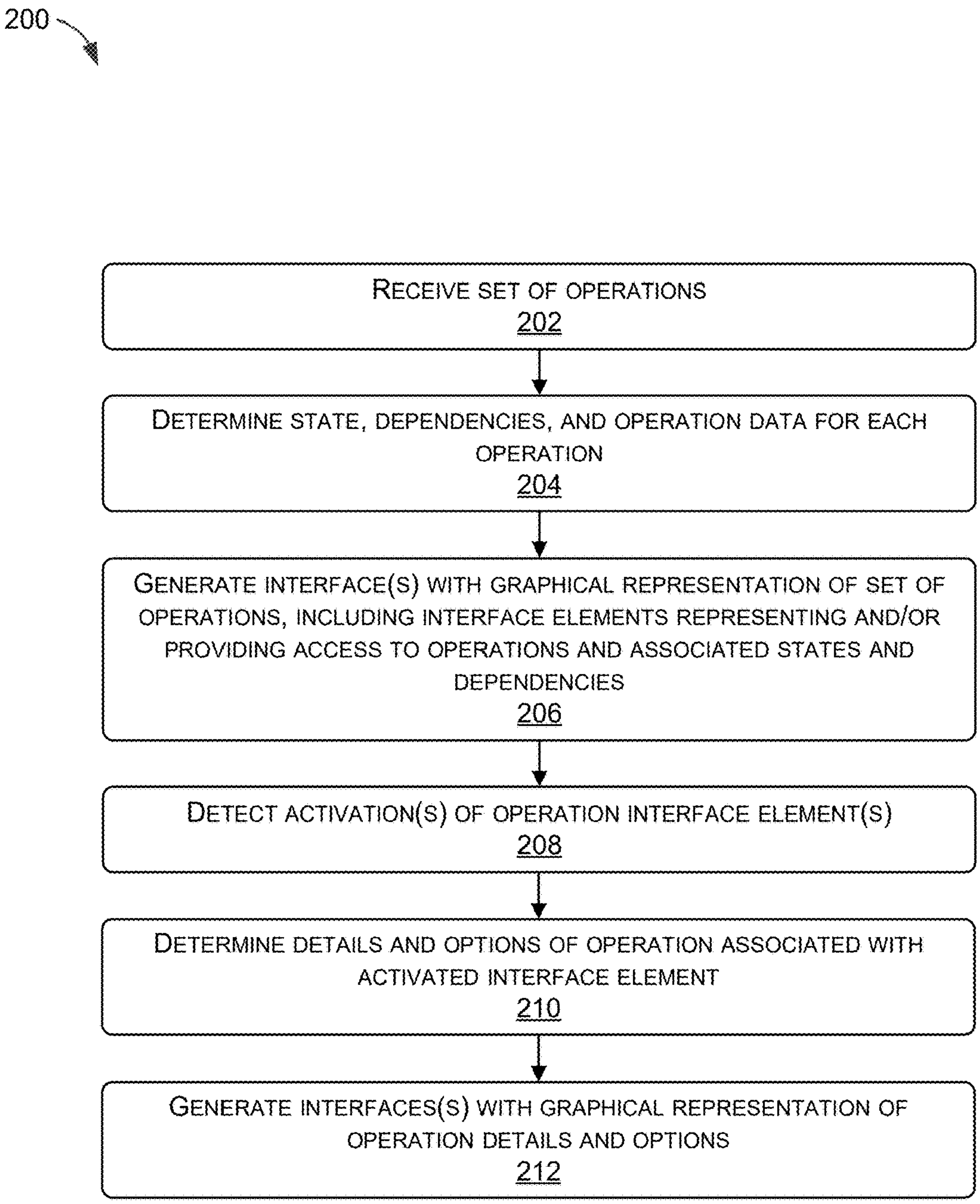
FIG. 2 is a flow diagram illustrating an example process for determining operation data and generating interfaces with interactive operation elements according to the examples of interactive nonlinear operation set navigation systems and methods described herein.

FIG. 2 is a flow diagram of an example process 200 for determining and/or generating an operation set navigation interface in an interactive nonlinear operation set navigation system. In examples, one or more operations of the process 200 may be implemented by an operation navigation system, such as by using one or more of the components and systems illustrated in FIG. 1 and described above and/or by using one or more of the components and systems illustrated in FIG. 8 and described below. For example, one or more such components and systems can include those associated with the operation navigation system 140 illustrated in FIG. 1. One or more such components and systems can also, or instead, include those associated with the computing device 800 illustrated in FIG. 8. In other examples, one or more operations of the process 200 may be performed by a combination of components described in regard to these systems and/or other systems. However, the process 200 is not limited to being performed by such components and systems, and the components and systems described herein are not limited to performing the operations of the process 200.

At block 202, a set of one or more operations (e.g., data representing such a set of operations and/or instructions associated with implementing a set of operations) may be received or otherwise determined, for example, at an interactive nonlinear operation set navigation system. The set of operations may be associated with accomplishing a particular computing system or service goal, such as the implementation of an application at a particular platform or the migration of an application from one platform to another. In examples, block 202 may be performed in response to user activation of an interface element and/or based on data associated with an interface generation component (e.g., browser state as stored in memory).

At block 204, the system may determine states and dependencies for each operation in the set of operations. For example, the system may determine the activities associated with each operation, the one or more operations (if any) upon which each operation may depend, and/or the one or more operations (if any) that may be dependent on each operation. The system may also, or instead, determine documentation, operation performance data (e.g., historical operation performance data), and/or any other data related to the operations in the set that may be used in the disclosed systems and techniques.

At block 206, the system may generate an interface that includes graphical interface elements representing the operations in the set of operations and the relationships (e.g., dependencies and/or groupings) between the operations. The generated interface elements may also, or instead, provide a means of accessing operation data and/or other data. For example, a graphical interface element representing an operation may be a user-activatable or user-selectable control that may, when selected, cause the user's device to generate another interface. In a particular example, a graphical interface element representing an operation may be a user-selectable link that, when activated, may cause a browser on the user's device to generate another interface, in examples, based on a browser state and/or data in memory associated with the browser, and/or based on communication with a remote system, such as a component of an interactive nonlinear operation set navigation system.

The block 206 may be performed at or in conjunction with multiple user devices to enable nonlinear presentation and interaction with the interface elements representing operations. For example, multiple users may be involved in performing a set of operations and therefore may be interacting with an interactive nonlinear operation set navigation system. Thus, multiple interfaces may be generated (e.g., one or more at each user's device). The system may update such interfaces proactively as operations and/or their associated activities are performed by, for example, transmitting updated interface data to interface generation components at the various user devices. Alternatively or additionally, interface generation components at the various user devices may query the interactive nonlinear operation set navigation system for updated data periodically and/or in response to various detected conditions.

At block 208, the system may detect an activation of an interface element associated with or otherwise representing an operation. Such activation may take any effective form of a user activating a control representing an operation, such as the selection of a button or link. This activation may also, or instead, be automated or otherwise responsive to one or more other detected conditions. For example, the system may be configured to automatically generate an interface representing data associated with a second operation that is dependent on a first operation upon detecting that the first operation has been successfully completed.

At block 210, the system may determine data associated with the operation for which an interface element was activated and/or other data for generating an interface for presenting data associated with such an operation to a user. At block 212, the system may generate an interface representing operation data, such as operation details, other controls and/or interface elements associated with the operation. Examples of the interfaces and data that may be processed according to process 200 are illustrated and described in more detail herein, for example, in regard to FIGS. 1, 6, and 7.

Figure 3:
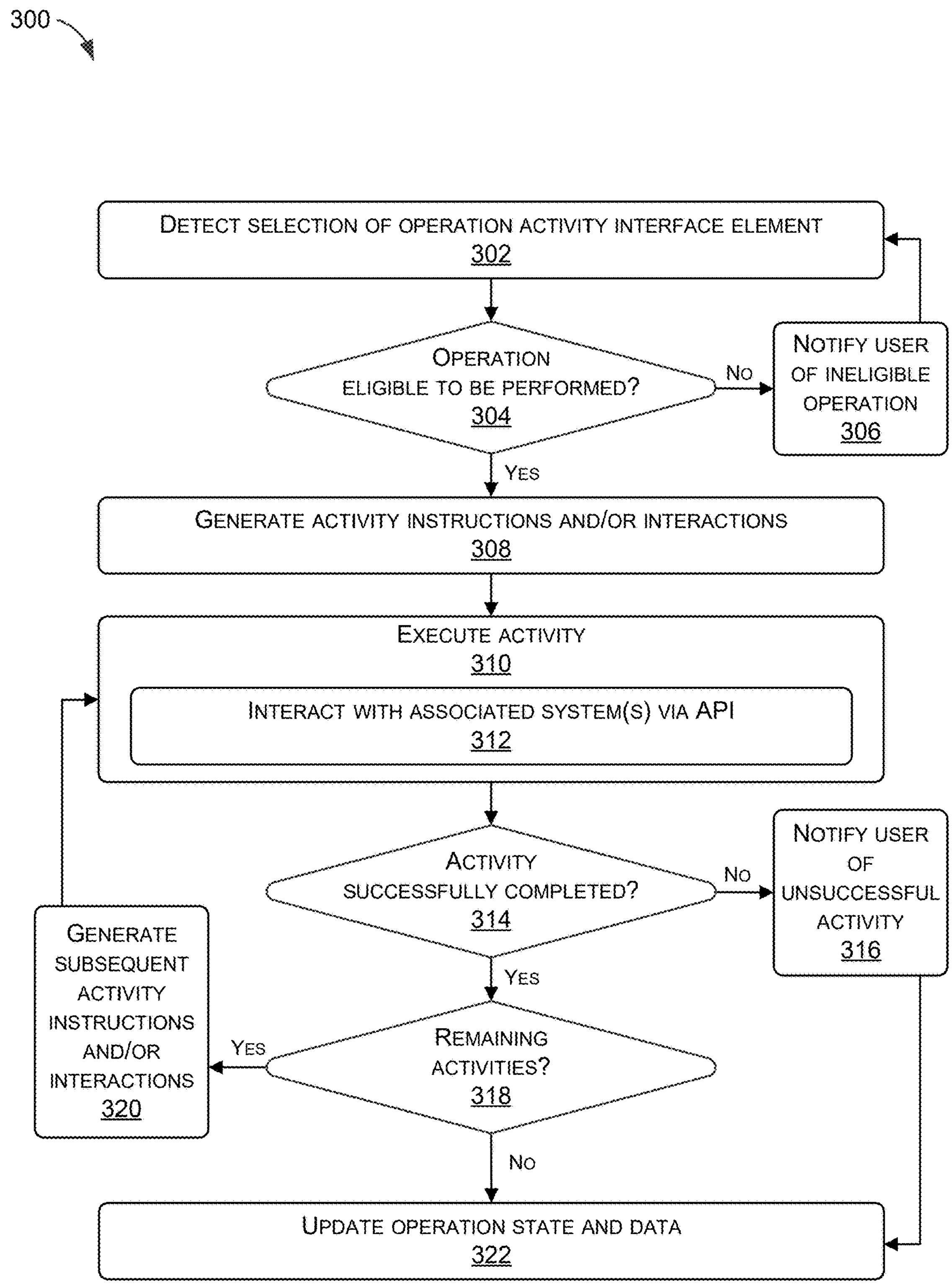
FIG. 3 is a flow diagram illustrating an example process for determining operation selections, executing operation activities, and generating operation data using interactive operation elements according to the examples of interactive nonlinear operation set navigation systems and methods described herein.

FIG. 3 is a flow diagram of an example process 300 for performing an operation and/or an operation activity and generating operation data in an interactive nonlinear operation set navigation system. In examples, one or more operations of the process 300 may be implemented by an operation navigation system, such as by using one or more of the components and systems illustrated in FIG. 1 and described above and/or by using one or more of the components and systems illustrated in FIG. 8 and described below. For example, one or more such components and systems can include those associated with the operation navigation system 140 illustrated in FIG. 1. One or more such components and systems can also, or instead, include those associated with the computing device 800 illustrated in FIG. 8. In other examples, one or more operations of the process 300 may be performed by a combination of components described in regard to these systems and/or other systems. However, the process 300 is not limited to being performed by such components and systems, and the components and systems described herein are not limited to performing the operations of the process 300.

At block 302, the system may detect or determine a selection or activation of an interface element representing an operation activity. For example, an operation interface may be generated in response to selection of an interface element representing that operation on an interface representing an associated set of operations (e.g., generated as described in FIG. 2). The operation interface may include various interface elements and/or controls that may be associated with the operation, such as control that may initiate, or facilitate initiation of the operation and/or an activity of the operation. In examples, a graphical interface element associated with initiation of an operation and/or an activity may be a user-selectable link that, when activated, may cause a browser on the user's device to generate data (e.g., instructions, electronic communications, etc.) based on a browser state and/or data in memory associated with the browser that may be used to communicate with a remote system, such as a component of an interactive nonlinear operation set navigation system and/or one or more components of a platform at which a system or component associated with the goal of the set of operations may be configured.

At block 304, the system may determine if the operation associated with the selected element is currently eligible to be performed. For example, the operation may be dependent upon the successful completion of one or more other operations. If the system determines, at block 304, that the operation(s) on which the operation associated with the selected element has not been successfully completed, the system may, at block 306, inform the user that the operation cannot be initiated at this time. To inform the user of operation ineligibility, the system may present an interface or interface element to the user with information regarding the ineligibility of the operation (e.g., informing the user of the required operations that are not complete). The system may also, or instead, present a visual or audible indication that the operation activity could not be initiated. Any other form of indicating to a user that the operation is not currently eligible for initiation may be used. The process 300 may return to block 302 to await a subsequent selection of an operation activity element.

If, at block 304, the system determines that the operation may proceed (e.g., all operations upon which this operation depends have been successfully completed), at block 308 the system may generate instructions and/or other data that may be used to initiate an activity associated with the selected element. In examples, the operation associated with the selected element may be associated with more than one activity or action, while in other examples the operation may include a single activity or action. For multiple activity or action operations, the system may perform the multiple activities or actions in any order, including in a predetermined dependency order, where an activity or action may depend upon completion of another activity or action, and/or in parallel or simultaneously, where an activity or action may not depend upon completion of another activity or action.

For example, where the activity involved interaction with one or more remote components (e.g., devices or resources configured at a platform), the system may determine, at block 308, access information for the one or more remote components, such as one or more addresses, API keys, usernames, passwords, secret keys, public/private keys, etc. Some or all of such access information may be encrypted before transmission to one or more remote components. The system may also, or instead, generate and/or determine one or more instructions to be transmitted to the one or more remote components. The system may also, or instead, generate and/or determine other data, such as data to be transmitted to the one or more remote components, data expected to be received from the one or more remote components to confirm the status of the initiated activity, potential indications of activity status, etc.

At block 310, the system may execute the activity associated with the selected element. In examples, this may include presenting an interface to a user to facilitate the user's interaction with one or more remote components. Such an interface may be presented to the user by an interface generation component (e.g., in a web browser) and generate and exchange communications with the one or more remote components based on user input. In examples, the system, at block 312, may use an API to interact with one or more remote components, provide instructions to such components, and/or receive data from such components to execute the activity associated with the selected element.

At block 314, the system may determine whether the activity has been successfully completed. If not, at block 316 the system may notify the user of the failure to complete the activity. An activity may fail due to any number of issues. For example, one or more systems or components involved in executing the activity may be unreachable for some reason (e.g., component down, network issues, failure to authenticate, etc.). In other examples, the system may be able to successfully transmit instructions to one or more systems or components involved in executing the activity, but the systems or components may be unable to execute the instructions for some reason. In this case, the systems or components may return an error code or other data that the system may use to determine how and whether to inform the user of the activity failure. For example, the system may present an interface or interface element to the user with information regarding the failure of the activity, where the interface or element may include information indicating or based on the error code and/or other data received from the systems and/or components that failed to complete the activity instructions. The system may also, or instead, present a visual or audible indication that the operation activity could not be completed. Any other form of indicating to a user that an operation activity failed to be successfully completed may be used. The process 300 may move to block 322 to update operation data associated with the operation with which the activity is associated to indicate the failure.

If, at block 314, the system determines that the activity has been successfully completed, at block 318, the system may determine if there are other activities to be (e.g., automatically) completed as part of the associated operation. For example, an operation may be manually initiated via input from a user but may involve multiple activities that may be executed sequentially. Upon initiation of the operation, the system may attempt to perform the associated activities. At block 318, if the system determines that a next activity remains to be performed for the associated operation, at block 320, the system may generate activity instructions, interaction, and/or other data and return to block 310 and/or block 312 to execute the activity. If there are no more activities associated with this operation, the process may move to block 322 to update operation data associated with the operation with which the activity is associated to indicate the successful completion of the operation and/or store other data associated with the operation. For example, the operation state may be updated to indicate that the operation is complete. Examples of the interfaces and data that may be processed according to process 300 are illustrated and described in more detail herein, for example, in regard to FIGS. 1, 6, and 7.

FIG. 4 is a flow diagram of an example process 400 for performing an operation and/or an operation activity and generating operation duration data and other temporal operation data in an interactive nonlinear operation set navigation system. In examples, one or more operations of the process 400 may be implemented by an operation navigation system, such as by using one or more of the components and systems illustrated in FIG. 1 and described above and/or by using one or more of the components and systems illustrated in FIG. 8 and described below. For example, one or more such components and systems can include those associated with the operation navigation system 140 illustrated in FIG. 1. One or more such components and systems can also, or instead, include those associated with the computing device 800 illustrated in FIG. 8. In other examples, one or more operations of the process 400 may be performed by a combination of components described in regard to these systems and/or other systems. However, the process 400 is not limited to being performed by such components and systems, and the components and systems described herein are not limited to performing the operations of the process 400.

At block 402, the initiation of an operation (and/or an activity within an operation) may be detected. For example, as described in more detail herein, the system may detect the selection or activation of a control on an operation interface (see, e.g., FIGS. 2 and 3 and associated description) by detecting or receiving data generated and transmitted in response to such a selection or activation by an interface generation component of a user device (e.g., web browser). Further at block 402, the system may retrieve data associated with the initiated operation for use in other portions of the process 400.

At block 404, the system may start a timer associated with the initiated operation. Alternatively or additionally, the system may store and associate, with the initiated operation, a start time representing the time at which initiation of the operation was detected.

At block 406, the system may determine if the operation has been successfully completed. The system may determine, for example, operation completion based on determining that the last activity, or all activities, associated with the operation has been successfully completed. This information may be stored in an operation data store. Alternatively or additionally, the system may detect communications associated with the operation (e.g., exchanged via API with one or more remote components involved in the operation) and determine operation completion status based on such communications.

If the operation is not complete as evaluated at block 406, the process 400 may continue to monitor execution of the operation and/or its various associated activities. In some examples, there may be a timeout threshold so that timing information is not collected for operations that fail to complete.

If, at block 406, the system determines that the operation has been successfully completed, at block 408, the system may stop the timer and/or otherwise determine the duration of the operation.

At block 410, the system may evaluate the operation duration against one or more operation duration thresholds. Such thresholds may be associated with one or more actions. For examples, an alert may be provided to a user when an operation takes longer than a threshold duration to complete. In another example, a label or other data may be associated with the operation data when an operation takes longer than a threshold duration to complete. Any action and/or responsive data generation may be performed in response to an operation duration meeting or exceeding a duration threshold. If one or more duration thresholds have been met or exceeded, at block 412, the associated action(s) may be implemented.

Regardless of whether a duration threshold has been met, at block 414, operation duration data and/or any other data associated with the operation may be stored. The system may store this duration data with operation data in an operation data store, for example, with start and stop times for the operation and/or any other data that may be associated with the operation.

At block 416, the system may execute one or more duration operations based on the operation duration data. For example, the system may determine a ranking or position of the execution of the operation among other executions of the same or a similar operation based on duration (as described in more detail herein). In examples, one or more alerts may be generated, a label or other data may be associated with the operation data based on the operation duration, and/or any other action and/or responsive data generation may be performed based on the operation duration at block 416. In examples, teams or individuals may be ranked (e.g., positioned) and listed (e.g., on an interface, in an ordered list) based on the duration times for the same or substantially similar operations (e.g., operations based on a same operation template). In further examples, staffing comparison and/or recommendations may be determined based on duration times. For instance, a number and/or classifications of users assigned to operations may be determined for comparison on an operation duration basis in order to determine a more efficient allocation of personnel and/or recommendations for staffing on a per-operation basis. Examples of the interfaces and data that may be processed according to process 400 are illustrated and described in more detail herein, for example, in regard to FIGS. 1, 6, and 7.

Figure 5:
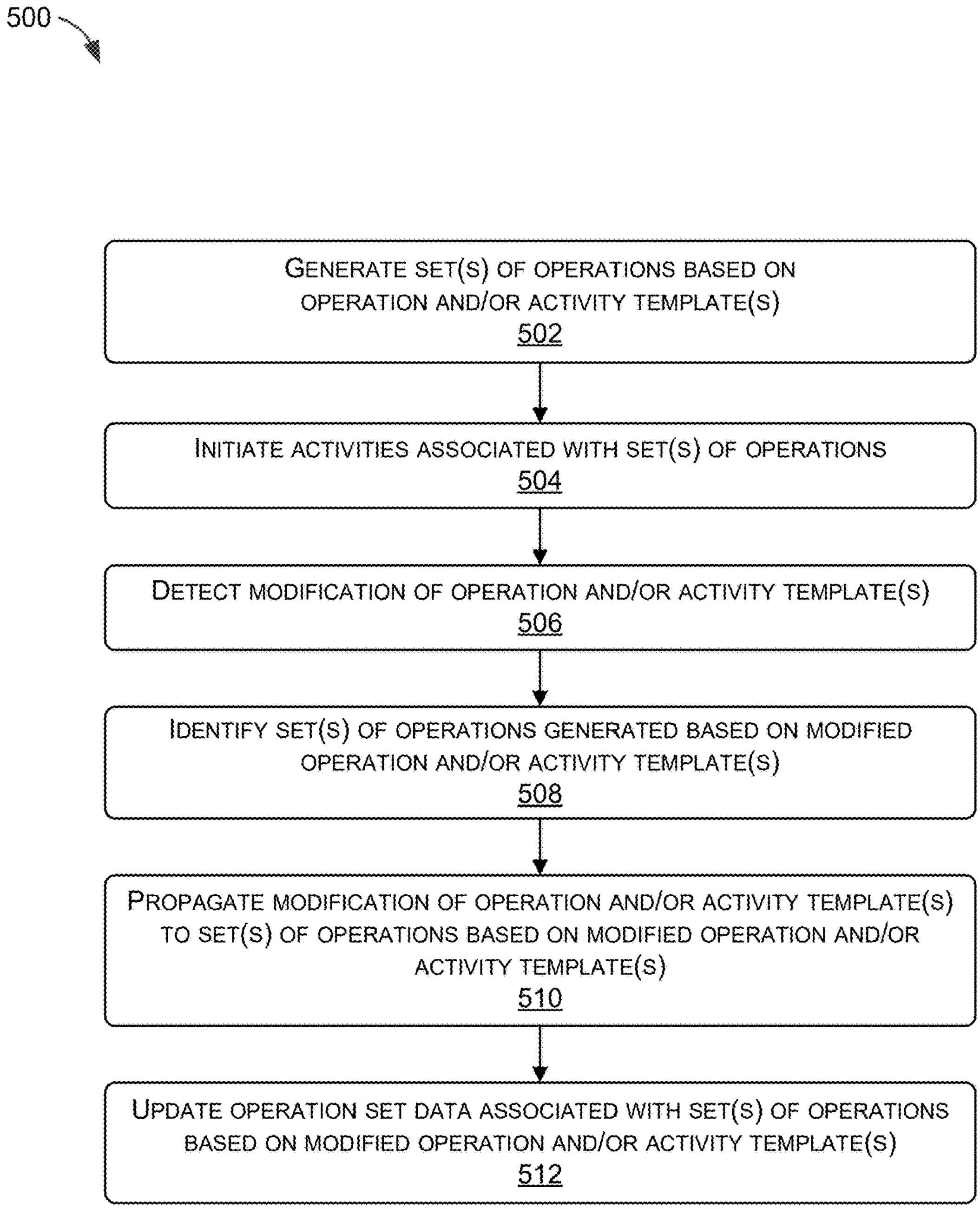
FIG. 5 is a flow diagram illustrating an example process for modifying operation templates and propagation of such modifications to active operation according to the examples of interactive nonlinear operation set navigation systems and methods described herein.

FIG. 5 is a flow diagram of an example process 500 for updating an operation template and propagating the changes to the template to operations based on the template in an interactive nonlinear operation set navigation system. In examples, one or more operations of the process 500 may be implemented by an operation navigation system, such as by using one or more of the components and systems illustrated in FIG. 1 and described above and/or by using one or more of the components and systems illustrated in FIG. 8 and described below. For example, one or more such components and systems can include those associated with the operation navigation system 140 illustrated in FIG. 1. One or more such components and systems can also, or instead, include those associated with the computing device 800 illustrated in FIG. 8. In other examples, one or more operations of the process 500 may be performed by a combination of components described in regard to these systems and/or other systems. However, the process 500 is not limited to being performed by such components and systems, and the components and systems described herein are not limited to performing the operations of the process 500.

At block 502, an operation template may be used to generate one or more operations of a set of operations. For example, an operation template may include a set of instructions and/or activities that may be performed for various goals (e.g., implementing an application at a platform, migrating an application from one platform to another, etc.). The operation template (e.g., a copy of the operation template) may be stored as an operation and associated with a set of operations for accomplishing a particular goal. The operation template may be modified to generate the operation associated with the set of operations by customizing the instructions and/or activities therein. For example, the operation template may be updated to include specific addresses, resource identifiers, APIs, API keys, secret keys, etc. that may be used to perform the operation generated based on the modified template. The operation generated based on the operation template may then be integrated into the set of operations, including determining and/or updating dependencies and relationships with other operations in the set of operations.

At block 504, one or more operations and/or activities associated with the set of operations may be initiated. For example, a first user may initiate execution of a first operation and a second user may initiate execution of a second, distinct operation that is not dependent upon the first operation. These initiations may include initiating one or more activities associated with the operations (e.g., as described herein).

At block 506, the operation template on which one or more operations may have been based may be modified. For example, an activity may be added, removed, and/or modified. In another example, operation data and/or attributes may be added, removed, and/or modified. The system may detect this modification based on user manipulation of the operation template via an interface and activation of various interface elements.

At block 508, the system may then determine one or more sets of operations that may include an operation generated using the operation template that has been modified (e.g., as detected at block 506). In examples, an interactive nonlinear operation set navigation system may store data for operations indicating, if applicable, an operation template on which such operations may have been based. Alternatively or additionally, the system may store data for individual templates indicating active operations (e.g., operations that have not been completed and/or operations associated with a set of operations that has not been completed) that have been generated based on respective individual templates.

At block 510, the system may (e.g., actively and automatically) update the active operations based on the modified operation template (e.g., adding, removing, and/or modifying activities; adding, removing, and/or modifying operation data and/or attributes; etc.). In examples, the system may update the operation generated at block 502 based on the operation template with the modifications made to that template that were detected at block 506. The operation may be updated regardless of whether it remains active (e.g., has or has not been successfully completed) in some examples, while in other examples the operation may be updated only if it remains incomplete At block 512, the operation set data may also be updated. For example, a modification to an operation template may include a change to dependency, making the operations based on the template dependent on one or more other operations and/or removing one or more such dependencies. The operation template dependency modification may also, or instead, make one or more other operations dependent on the operation based on the template and/or remove the dependency of one or more other operations on the operation based on the template.

Corresponding changes to the operation may be indicated in graphical representations of the operation. For example, if the modification of the operation template included adding an operation dependency to the template, the graphical representation of the operation across all interfaces (e.g., presented to users on user devices) that present such representations may be updated based on this dependency (e.g., to show that the operation is or is not eligible to be performed based on the dependency). Examples of the interfaces and data that may be processed according to process 500 are illustrated and described in more detail herein, for example, in regard to FIGS. 1, 6, and 7.

Figure 6:
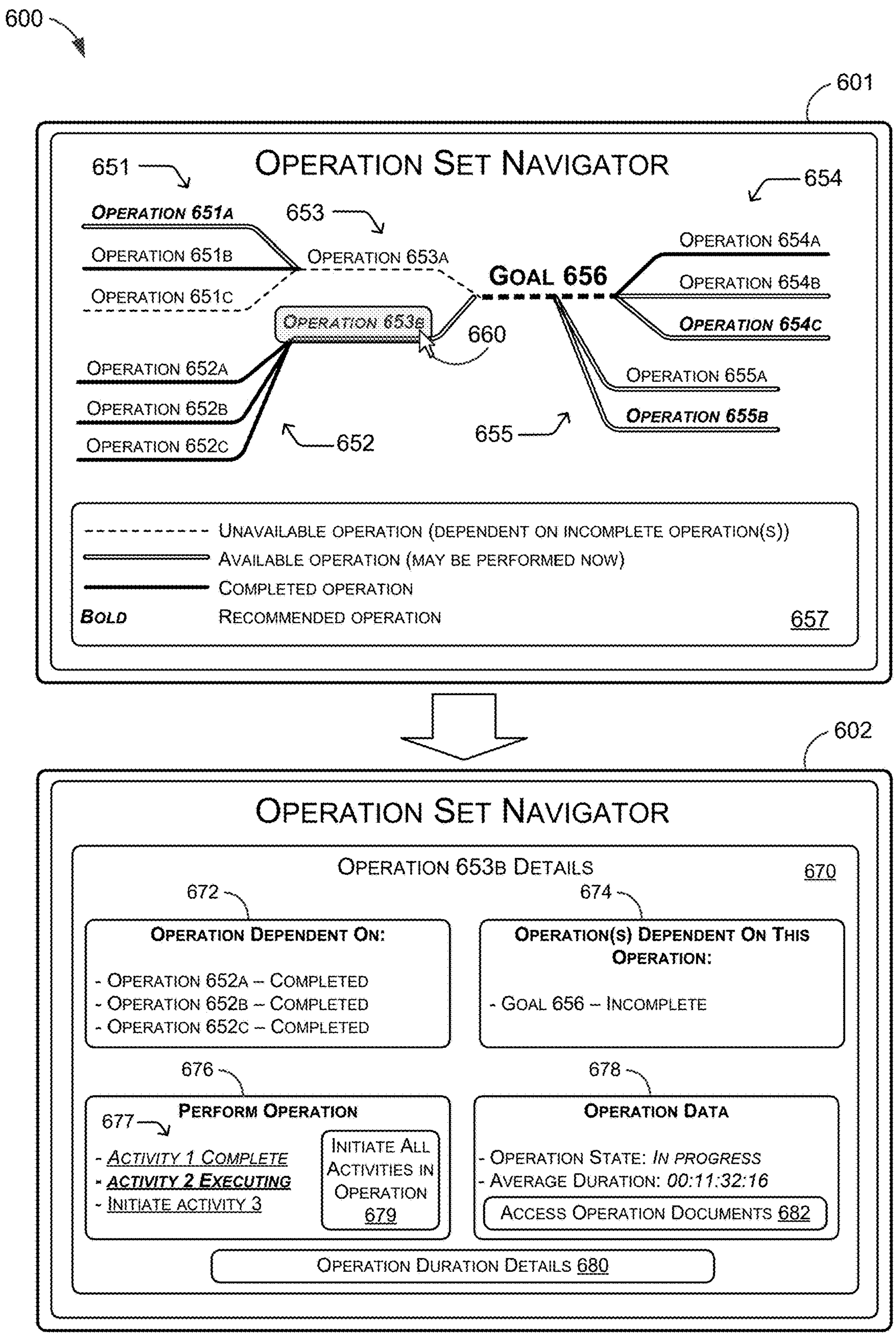
FIG. 6 is a block diagram illustrating exemplary interfaces and various interface elements that may be generated and used to initiate various interactions according to the examples of interactive nonlinear operation set navigation systems and methods described herein.

FIG. 6 illustrates a block diagram of exemplary interfaces, interface elements, and data that may be generated and processed at an interactive nonlinear operation set navigation system as described herein. The system may generate an operation set navigator interface 601 by transmitting data to an interface generation component on a user device based on state data associated with the interface generation component (e.g., web browser state data). Such state data may include an indication of a particular set of operations, such as the set of operations 656 associated with a particular goal. This goal may be associated with accomplishing a particular implementation or migration of an application or any other goal that may be achieved via the successful completion of a set of operations.

The set of operations 656 may include various operations represented as operation interface elements in the interface 601. Operations may be grouped based on various criteria, such as associated computing resources (e.g., each operation in the group interacts with or is otherwise associated with a same or similar computing resource), associated users (e.g., each operation in the group is to be performed by members of the same team or by the same user), timeframe (e.g., operations in the group are scheduled to be performed during a particular window of time), and/or any other criteria or combination thereof.

Dependency relationships between operations may be visually depicted by the elements of the interface 601. For example, as shown in interface 601, a group of operations 651 may include operations 651*a*, 651*b*, and 651*c* that may all need to be completed before dependent operation 653*a* of a group of operations 653 may be initiated. The group of operations 653 may also include operation 653*b* that may depend on the completion of the operations in the group of operations 652 (including operations 652*a*, 652*b*, and 652*c*). Because these operations have been completed, the operation 653*b* may now be executed. The interface 601 further includes interface elements representing a group of operations 654 and individual operations 654*a*, 654*b*, and 654*c*, and a group of operations 655, including operations 655*a* and 655*b*.

The operation interface elements represented in the interface 601 may visually indicate various operation states and operation data. Definitions of the visual representations of such states and data may be indicated in a key or legend, such as legend 657 included in the interface 601. As shown here, particular operations may be represented as unavailable due to depending on operations that are not yet complete, available for current execution, and/or completed. Particular operations may also, or instead, be recommended for performance next (e.g., among an associated group of operations). As can be seen here, because the exemplary system facilitates the nonlinear performance of operations, several operations may be available for current performance or execution, and several of those operations may currently be recommended as next operations to be performed or executed. The interface 601 may be generated on multiple user devices and may facilitate the execution of multiple operations simultaneously and/or during overlapping time periods by multiple users.

As shown in the exemplary interface 601, the operation 651*a* of the group of operations 651 may currently be eligible to be performed, the operation 651*b* may be complete, and the operation 651*c* may currently be unavailable (e.g., due to dependence on some activity or operation that remains incomplete (not shown)). Among the group of operations 651, the operation 651*a* is indicated as the currently recommended operation.

In the group of operations 652, all of the operations 652*a-c* may be complete. The group of operations 653 may include an operation 653*a* that is dependent on completion of the group of operations 651 and therefore is not currently available for performance or execution, while an operation 653*b* of the group of operations 653 is currently available (and is also recommended) because that operation depends on the group of operations 652, all of which have been completed.

As noted, the nonlinear operation capabilities of the disclosed system allow for multiple operations to be available and performed or executed in a nonsequential manner. For example, as shown in exemplary interface 601, the group of operations 654 may include a completed operation 654*a* and two available operations 654*b* and 654*c*. While operation 654*c* may be recommended as the next operation to be performed among the group of operations 654, both operations 654*b* and 654*c* may currently be performed, as indicated by their respective visual representations. Similarly, the group of operations 655 may include two available operations 655*b* and 655*c* that may each be currently performed (also as indicated by their respective visual representations), with operation 655*b* being recommended as the next operation to be performed among the group of operations 655.

The individual operation interface elements of the interface 601 may be a user-selectable or user-activatable control that may generate instructions and/or requests for additional data and/or to perform one or more actions. Such requests may be based on a state of an interface generation component and/or based on data stored at a user device and/or at the interactive nonlinear operation set navigation system. For example, if a user device's interface generation component (e.g., web browser) is currently in a state associated with the presentation of the set of operations 656, an activation by a user of an element associated with an operation in that set may generate a request for data that may then be used, when received by the interface generation component, to generate an interface presenting information and/or including controls associated with that element.

For example, the interface element associated with the operation 653*b* may be activated (e.g., selected) by a user, represented as activation 660 in FIG. 6. This activation may generate a request for an interface representing additional operation data and/or details associated with the operation 653*b* (e.g., cause an interface generation component to generate and transmit such a request to an interactive nonlinear operation set navigation system). The interactive nonlinear operation set navigation system may responsively generate, and/or transmit data causing the generation of, an interface, such as interface 602. The interface 602 may be another operation set navigator interface presenting detailed operation 653*b* data 670.

Included and/or represented in operation data 670 may be operation dependency data element 672 indicating one or more operations on which the operation 653*b* may be dependent. In other words, the operation 653*b* may not be eligible to be performed until the operations represented by the operation dependency data element 672 are complete. The operation dependency data element 672 may also include operation data associated with the operations on which the operation 653*b* may be dependent, such as current operation state. As shown here, in this example, the operation 653*b* may be dependent on operations 652*a-c*, each of which may have a current state of "completed."

Further included and/or represented in operation data 670 may be operation dependency data element 674 indicating one or more operations that may be dependent upon the successful completion of the operation 653*b*. In other words, the operation 653*b* may be required to be successfully completed before the operations represented by the operation dependency data element 674 may be eligible to be performed. The operation dependency data element 674 may also include operation data associated with the operations that depend on the operation 653*b*, such as current operation state. As shown here, in this example, the goal 656 may be an operation (e.g., the only remaining operation) dependent on the operation 653*b* and may have a current state of "completed."

Further included and/or represented in operation data 670 may be an operation execution element 676 indicating one or more activities that may be included as part of the operation, data related to such activities and/or the operation, and/or one or more controls to perform such activities and/or other actions related to the operation. As shown here, in this example, the operation execution element 676 may indicate that the activities 677 are included in the performance of the operation 653*b*. The activities 677 may be individually represented along with, in examples, activity data, such as current state data. For instance, activity 1 shown in the operation execution element 676 may be complete, activity 2 may be currently executing, and activity 3 may be available for initiation. Each of the activities represented in the operation execution element 676 may be represented as a user-activatable or user-selectable control. Selection of such a control may initiate the activity and/or cause one or more other actions (e.g., generation of an activity detail interface). The operation execution element 676 may also, or instead, include operation data and/or controls, such as control 679 that may be activated to initiate one or more (e.g., all) operation activities. As described herein, the activation of one or more of such activity or operation controls may initiate an API interaction with a remote computing resource (e.g., a cloud-based computing resource) to perform actions associated with the activity and/or operation.

Further included and/or represented in operation data 670 may be an operation data element 678 indicating one or more attributes, parameters, and/or controls associated with the operation. As shown here, in this example, the operation data element 678 may indicate the current operation state and the current duration of the operation (e.g., time since the operation 653*b* was initiated). The operation data element 678 may also, or instead, include a control 682 that will generate an interface presenting documentation relating to the operation 653*b*.

The operation data 670 and/or the interface 602 may include further controls for access to additional interfaces, elements, data, and/or controls. For example, an operation duration control element 680 may be presented with the operation data 670 and may generate, when activated, a request for an interface representing operation duration data associated with the operation 653*b*, such as the interface 702 described below in regard to FIG. 7. Such a request may be based on a state of an interface generation component and/or based on data stored at a user device and/or at the interactive nonlinear operation set navigation system. For example, if a user device's interface generation component (e.g., web browser) is currently in a state associated with the presentation of the interface 602, an activation by a user of the control element 680 may generate a request for data that may then be used, when received by the interface generation component, to generate an interface presenting operation duration information and/or including controls associated with that element.

Figure 7:
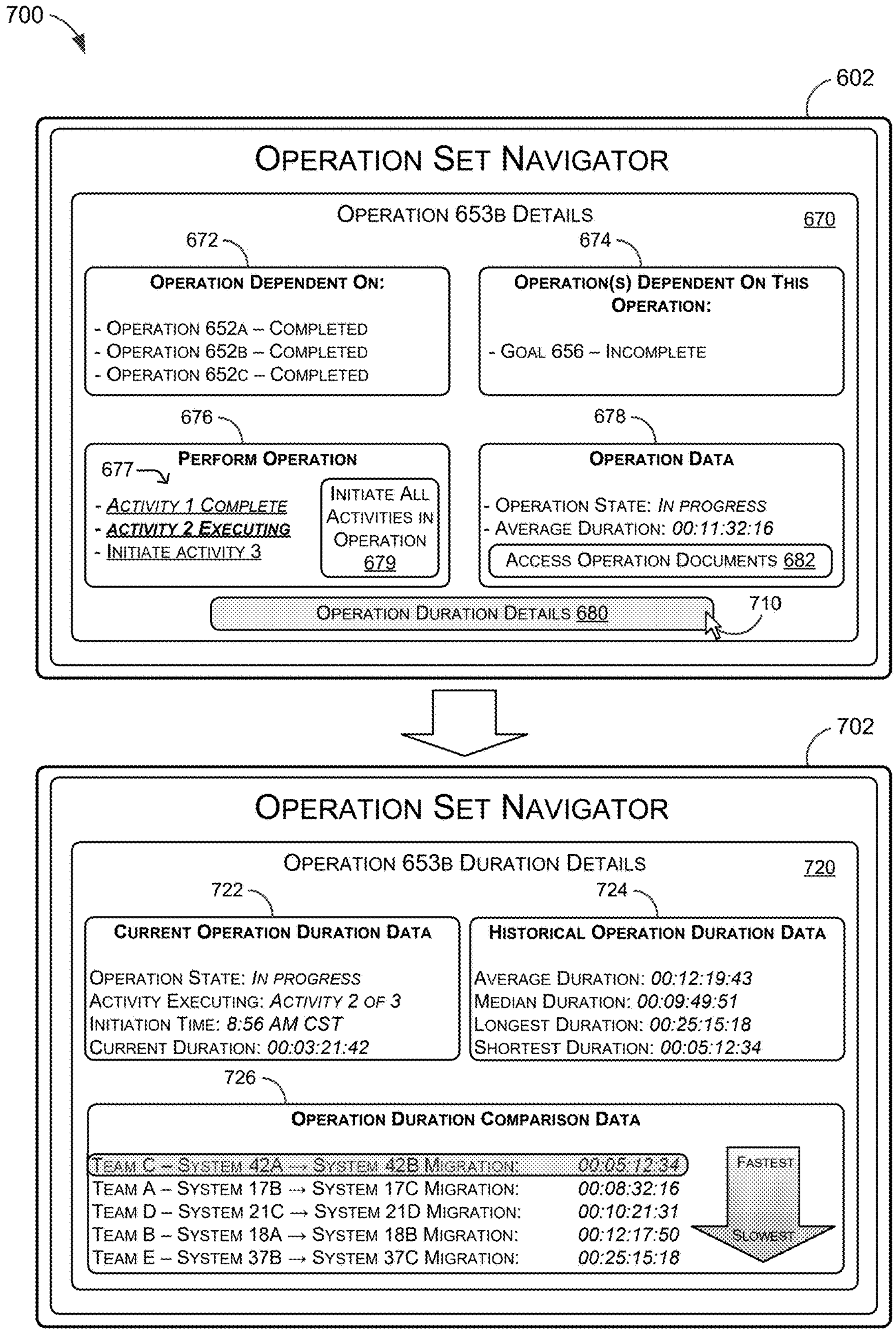
FIG. 7 is a block diagram illustrating exemplary interfaces and various interface elements that may be generated and used to initiate various interactions according to the examples of interactive nonlinear operation set navigation systems and methods described herein.

FIG. 7 illustrates a block diagram of exemplary interfaces, interface elements, and data that may be generated and processed at an interactive nonlinear operation set navigation system as described herein. As described above, the activation of the control element 680 in the interface 602 (introduced in FIG. 6 and reproduced in FIG. 7), represented as activation 710 in FIG. 7, may generate a request for an interface representing operation duration data and/or details associated with the operation 653*b* (e.g., cause an interface generation component to generate and transmit such a request to an interactive nonlinear operation set navigation system). The interactive nonlinear operation set navigation system may responsively generate, and/or transmit data causing generation of, an interface, such as interface 702. The interface 702 may be an operation set navigator interface presenting operation duration data, information, and/or controls associated with an operation (e.g., operation 653*b*).

In examples, the interactive nonlinear operation set navigation system may track operation durations for various operations. The system may store such data for further analysis and processing. For instance, the system may store information related to particular executions of a same or substantially similar operation (e.g., where such executions are of operations based on a same operation template and/or where such executions are executions of the same operation performed in different sets of operations, involving interaction with one or more different computing resources, by different teams or users, at different times, etc.). Information related to particular executions of a same or substantially similar operation may include start time, end time, duration, status (e.g., at completion of the execution of the operation), users and/or teams executing the operation, and any other data that may be generated and/or associated with an execution of an operation. The system may use such data to generate interfaces and interface elements that present such data to users and/or provide controls for taking actions based on such data.

For example, the system may generate interface 702 to include duration data 720 that may be associated with the operation 653*b*. The duration data 720 may include current operation duration data 722 that is directly associated with operation 653*b*. The current operation duration data 722 may include, but is not limited to, a current operation state (e.g., "In progress" in FIG. 7), a current activity and/or a total number of activities associated with the operation (e.g., "Activity 2 of 3" in FIG. 7), initiation time (e.g., "8:56 AM CST" in FIG. 7), and a current duration of the operation (e.g., "00:03:21:42" in FIG. 7).

The system may also, or instead, generate interface 702 and/or duration data 720 to include historical operation duration data 724 that may be based on duration data associated with operations similar to or the same as operation 653*b* (e.g., based on the same template; the same operation performed at a different time, by a different team or user, involving interaction with one or more different computing resources, in different sets of operations, etc.). For example, the system may determine average, median, longest, and/or shortest duration data for operations similar to or the same as the operation 653*b*, as shown in this example.

The system may also, or instead, generate interface 702 and/or duration data 720 to include operation duration comparison data 726 that may be based on duration data associated with operations similar to or the same as operation 653*b* (e.g., based on the same template; the same operation performed at a different time, by a different team or user, involving interaction with one or more different computing resources, in different sets of operations, etc.). For example, the system may rank various executions of comparable operations based on associated duration data, such as operation durations as shown in this example. The system may further include, in operation duration comparison data 726, identifiers for the teams and/or users involved in the particular operations, various aspects of the particular operations (such as the involved systems or applications, as shown in this example), and/or any other visual representation of comparative duration data.

As described above, one or more responsive actions may be taken based on various types of duration data, including any of the data described in regard to FIG. 7 and interface 702. For example, for an individual operation that has exceeded a duration threshold (e.g., upon detection of the duration exceeding the threshold even though the operation may be ongoing and/or upon completion of the operation), an alert may be generated (e.g., email, text message, alarm, pop-up, etc.) and transmitted to one or more users. In another example, the system may determine that an individual operation has exceeded an average duration of the same or similar operations and/or exceeded an average duration of the same or similar operations by a threshold amount (e.g., 25% above the average duration, 50% above the average duration, 100% above the average duration, etc.)

and, in response, may generate and/or transmit an alert indicating this extended duration to one or more users.

Teams and/or users that are significantly better than average at completing operations may also be determined. For example, the system may determine that an individual operation has been completed in under an average duration of the same or similar operations and/or under an average duration of the same or similar operations by a threshold amount (e.g., 25% below the average duration, 50% below the average duration, etc.) and, in response, may generate and/or transmit an alert indicating this exceptional duration to one or more users. In some examples, the alert may include an automated reward, such as an automatically generated electronic gift card, commendation, public acknowledgment, etc.

In another example, the system may determine an average duration per user to determine whether to alert regarding over and/or under staffing for particular operations. For example, the system may determine a total duration for a particular operation execution, and then divide the total duration by a number of users (e.g., overall or of different types) that performed that operation to determine an average per-user duration. The system may compare these per-user average durations to determine teams that are more or less efficient in performing operations. Threshold differences between teams and/or averages may be used to generate alerts as described for other duration determinations above.

Figure 8:
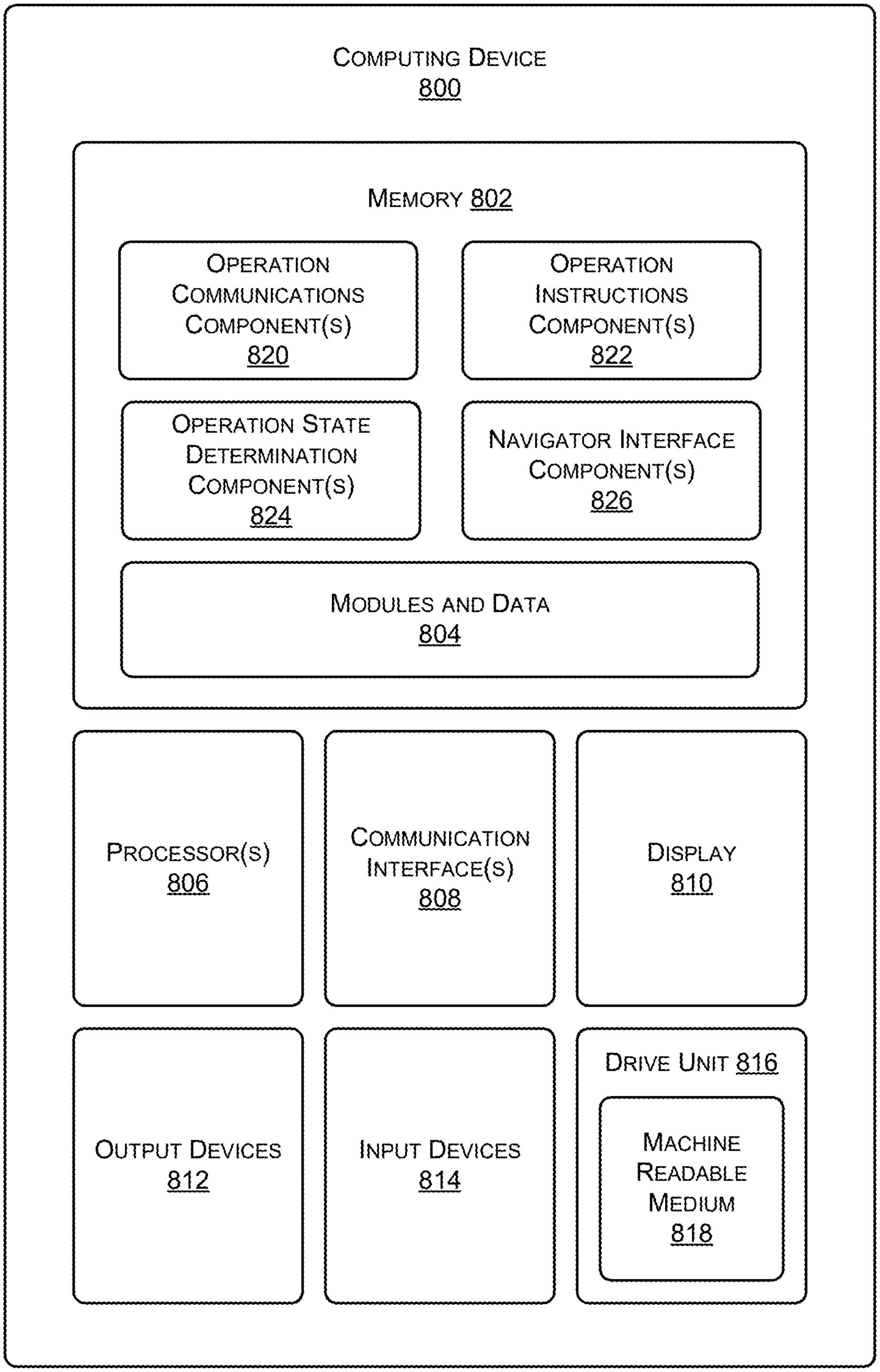
FIG. 8 shows an example system architecture for a computing device that may be used to implement the interactive nonlinear operation set navigation systems and methods described herein.

FIG. 8 shows an example system architecture for a computing device 800 that may be implemented as (e.g., part of) any of the systems and devices described herein and/or may perform any of the operations and processes described herein. For example, the computing device 800 may represent any of the systems, devices, and components illustrated in FIG. 1. The computing device 800 may also represent any system configured to implement any of the functions and operations described in regard to FIGS. 2-5 and/or any other operation described herein. The computing device 800 may also represent any system configured to generate any of the interfaces described in regard to FIGS. 1, 6, and 7 and/or any other interfaces described herein. The computing device 800 may be a server, computer, mobile device (e.g., smartphone, smartwatch, laptop), or any other type of computing device that may execute any of the operations described herein. In some examples, operations as described herein may be distributed among and/or executed by multiple computing devices 800.

A computing device 800 can include memory 802. In various examples, the memory 802 can include system memory, which may be volatile (such as RAM), nonvolatile (such as ROM, flash memory, etc.), or some combination of the two. The memory 802 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 800. Any such non-transitory computer-readable media may be part of the computing devices 800.

The memory 802 may include modules and data 804 needed to perform operations as described herein by one or more computing devices 800. Included with such modules and data 804 and/or also stored in the memory 802 may be one or more operation communications components 820, one or more operation instructions components 822, one or more operation state determination components 824, and/or one or more navigator interface components 826. The operation communications component(s) 820 may perform any one or more of the operations related to communications between resources, systems, devices, and components as described herein (e.g., as described for operation communications component 142 illustrated in FIG. 1). The operation instructions component(s) 822 may perform any one or more of the operations related to determining and/or generating operation instructions as described herein (e.g., as described for operation instructions component 144 illustrated in FIG. 1). The operation state determination component(s) 824 may perform any one or more of the operations related to determining and/or generating operation data (e.g., operation state data, operation duration data, etc.) associated with a particular operation and generating data for use by an operation navigation system as described herein (e.g., as described for operation navigation system 140 illustrated in FIG. 1). The navigator interface component(s) 826 may perform any one or more of the operations related to generating, transmitting and/or providing data and/or instructions for one or more operation set navigator interfaces or any other interface described herein (e.g., as described for navigator interface component 149 illustrated in FIG. 1).

One or more computing devices 800 may also have processor(s) 806, communication interface(s) 808, display(s) 810, output device(s) 812, input device(s) 814, and/or drive unit(s) 816 that may include one or more machine-readable media 818.

In various examples, the processor(s) 806 can be a central processing unit (CPU), a graphics processing unit (GPU), both a CPU and a GPU, or any other type of processing unit. Each of the one or more processor(s) 806 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 806 may also be responsible for executing computer applications stored in the memory 802, which can be associated with common types of volatile (RAM) and/or nonvolatile (ROM) memory.

The communication interfaces 808 may include transceivers, modems, interfaces, antennas, telephone connections, and/or other components that can transmit and/or receive data over wired and/or wireless networks, telephone lines, and/or other connections.

The display(s) 810 can be any one or more of a liquid crystal display or any other type of display commonly used in computing devices. For example, the display(s) 810 may include a touch-sensitive display screen that may also act as an input device or keypad, such as for providing a soft-key keyboard, navigation buttons, and/or any other type of input.

The output device(s) 812 may include any sort of output devices known in the art, such as the display(s) 810, one or more speakers, a vibrating mechanism, and/or a tactile feedback mechanism. Output devices 812 may also include one or more ports for one or more peripheral devices, such as headphones, peripheral speakers, and/or a peripheral display.

The input device(s) 814 may include any sort of input devices known in the art. For example, input device(s) 814 may include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine-readable media 818 of drive unit(s) 816 may store one or more sets of instructions, such as software or firmware, that embodies any one or more of the methodologies or functions described herein. The instructions can also reside, completely or at least partially, within the memory 802, processor(s) 806, and/or communication interface(s) 808 during execution thereof by the one or more computing devices 800. The memory 802 and the processor(s) 806 may also constitute machine-readable media 818.

With the techniques described herein, data received via, or otherwise associated with multiple communications channels may be more accurately associated with a particular context and more efficiently stored and provided for processing using an interaction interface. Furthermore, the communications channels may be changed while maintaining communications consistency with a user, thereby improving user satisfaction and increasing the efficiency of data collection and processing.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

generating, by a processor using an interface generation application executing on a user device, an operation set navigation interface comprising a plurality operation interface elements, wherein individual operation interface elements of the plurality operation interface elements correspond to individual operations of a plurality of computing resource operations and are configured to generate operation interfaces associated with the individual operations upon activation;

detecting, by the processor via the interface generation application, a first activation of a first operation interface element of the plurality operation interface elements;

generating, by the processor, in response to detecting the first activation, and based at least in part on a first memory state associated with the interface generation application, a first operation interface comprising an operation initiation control element configured to initiate an application programming interface (API) interaction with a computing resource, wherein the API interaction is based at least in part on a first operation corresponding to the first operation interface element;

detecting, by the processor via the interface generation application, a second activation of the operation initiation control element;

generating, by the processor, in response to detecting the second activation, and based at least in part on a second memory state associated with the interface generation application, a plurality of instructions based at least in part on the first operation;

transmitting, by the processor, the plurality of instructions to an API of the computing resource;

detecting, by the processor, a completion of the first operation;

determining, by the processor, an operation duration time based at least in part on detecting the second activation and detecting the completion of the first operation; and taking, by the processor, one or more actions based at least in part on the operation duration time.

2. The method of claim 1, wherein the first memory state associated with the interface generation application comprises an indication that the API interaction is eligible to be initiated.

3. The method of claim 2, wherein the indication that the API interaction is eligible to be initiated is associated with the completion of one or more operations of the plurality of computing resource operations on which the first operation is dependent.

4. The method of claim 1, wherein the individual operation interface elements of the plurality operation interface elements comprise a visual, non-textual indication of one or more states of a corresponding individual operation of the plurality of computing resource operations.

5. The method of claim 4, wherein the one or more states comprise one or more of an operation completion state, an operation eligibility state, an operation recommendation state, or an operation dependency state.

6. The method of claim 1, further comprising transmitting, to the interface generation application, a second plurality of instructions to generate a second operation interface element that, upon activation, causes the interface generation application to generate an operation duration interface associated with the first operation.

7. The method of claim 1, wherein taking the one or more actions comprises:

determining that the operation duration time meets or exceeds a duration time threshold; and taking the one or more actions further based at least in part on determining that the operation duration time meets or exceeds the duration time threshold.

8. The method of claim 1, wherein taking the one or more actions comprises:

determining a position of the operation duration time among a plurality of operation duration times associated with operation executions; and taking the one or more actions further based at least in part on the position of the operation duration time among the plurality of operation duration times.

9. The method of claim 1, wherein transmitting the plurality of instructions comprises transmitting one or more of an API key, a secret key, a username, or a password to the API of the computing resource.

10. A non-transitory computer-readable medium comprising instructions that, when executed by one or more processors, cause the one or more processors to perform operations comprising:

receiving, by a processor from an interface generation application executing on a user device, a first request for an operation set manipulation interface;

transmitting, by the processor to the interface generation application, first instructions to generate the operation set manipulation interface, the first instructions comprising instructions to generate a plurality operation interface elements, wherein individual operation interface elements of the plurality operation interface elements correspond to individual operations of a plurality of computing resource operations and are configured to generate operation interfaces associated with the individual operations upon activation;

detecting, by the processor via the interface generation application, a first activation of a first operation interface element of the plurality operation interface elements;

transmitting, by the processor to the interface generation application, in response to detecting the first activation, and based at least in part on a first memory state received from the interface generation application, second instructions to generate a first operation interface comprising an operation initiation control element configured to initiate execution of an instruction set at a computing resource, wherein the instruction set is based at least in part on a first operation corresponding to the first operation interface element;

detecting, by the processor via the interface generation application, a second activation of the operation initiation control element;

transmitting, by the processor, in response to detecting the second activation, the instruction set to the computing resource;

detecting, by the processor, a completion of the first operation;

determining, by the processor, an operation duration time based at least in part on detecting the second activation and detecting the completion of the first operation; and taking, by the processor, one or more actions based at least in part on the operation duration time.

11. The non-transitory computer-readable medium of claim 10, wherein the operations further comprise:

detecting, by the processor, a selection of a first operation template;

determining, by the processor, the instruction set based at least in part on the first operation template; and generating, by the processor, the first operation comprising the instruction set based at least in part on the first operation template.

12. The non-transitory computer-readable medium of claim 11, wherein the operations further comprise:

detecting, by the processor, a modification of the first operation template;

determining, by the processor, that the first operation was generated based at least in part on the first operation template; and modifying, by the processor, and based at least in part on determining that the first operation was generated based at least in part on the first operation template, the first operation.

13. The non-transitory computer-readable medium of claim 10, wherein the operations further comprise transmitting, by the processor to the interface generation application, third instructions to generate the operation set manipulation interface, the third instructions comprising instructions to generate a second operation interface element corresponding to the first operation based at least in part on detecting the completion of the first operation.

14. The non-transitory computer-readable medium of claim 13, wherein the second operation interface element is configured to generate, upon activation, an operation duration interface associated with the first operation.

15. The non-transitory computer-readable medium of claim 10, wherein the operations further comprise:

updating, by the processor in a computer memory, based at least in part on detecting the completion of the first operation, a dependency state of a second operation; and transmitting, by the processor to the interface generation application, third instructions to generate the operation set manipulation interface, the third instructions comprising instructions to generate a second operation interface element corresponding to the second operation, the second operation interface element indicating the updated dependency state.

16. A system comprising:

one or more processors; and a non-transitory memory storing computer-executable instructions that, when executed, cause the one or more processors to perform operations comprising:

receiving, from an interface generation application executing on a user device, a first request for an operation set manipulation interface;

transmitting, to the interface generation application, first instructions to generate the operation set manipulation interface, the first instructions comprising instructions to generate a plurality operation interface elements, wherein individual operation interface elements of the plurality operation interface elements correspond to individual operations of a plurality of computing resource operations and are configured to generate operation interfaces associated with the individual operations upon activation;

detecting, via the interface generation application, a first activation of a first operation interface element of the plurality operation interface elements;

transmitting, to the interface generation application, in response to detecting the first activation, and based at least in part on a first memory state received from the interface generation application, second instructions to generate a first operation interface comprising an operation initiation control element configured to initiate execution of an instruction set at a computing resource, wherein the instruction set is based at least in part on a first operation corresponding to the first operation interface element;

detecting, via the interface generation application, a second activation of the operation initiation control element;

generating, in response to detecting the second activation, and based at least in part on a second memory state received from the interface generation application, a plurality of instructions based at least in part on the first operation;

transmitting the instruction set to the computing resource;

detecting a completion of the first operation;

determining an operation duration time based at least in part on detecting the second activation and detecting the completion of the first operation; and taking one or more actions based at least in part on the operation duration time.

17. The system of claim 16, wherein transmitting the instruction set to the computing resource comprises transmitting one or more instructions to an application programming interface (API) of the computing resource.

18. The system of claim 16, wherein the first operation interface element comprising an indication of a state of the first operation.

19. The system of claim 16, wherein the operations further comprise:

determining that the operation duration time meets or exceeds a duration time threshold; and taking the one or more actions further based at least in part on determining that the operation duration time meets or exceeds the duration time threshold.

20. A system comprising:

means for receiving, from an interface generation application executing on a user device, a first request for an operation set manipulation interface;

means for transmitting, to the interface generation application, first instructions to generate the operation set manipulation interface, the first instructions comprising instructions to generate a plurality operation interface elements, wherein individual operation interface elements of the plurality operation interface elements correspond to individual operations of a plurality of computing resource operations and are configured to generate operation interfaces associated with the individual operations upon activation;

means for detecting, via the interface generation application, a first activation of a first operation interface element of the plurality operation interface elements;

means for transmitting, to the interface generation application, in response to detecting the first activation, and based at least in part on a first memory state received from the interface generation application, second instructions to generate a first operation interface comprising an operation initiation control element configured to initiate execution of an instruction set at a computing resource, wherein the instruction set is based at least in part on a first operation corresponding to the first operation interface element;

means for detecting, via the interface generation application, a second activation of the operation initiation control element;

means for generating, in response to detecting the second activation, and based at least in part on a second memory state received from the interface generation application, a plurality of instructions based at least in part on the first operation;

means for transmitting the instruction set to the computing resource;

means for detecting a completion of the first operation;

means for determining an operation duration time based at least in part on detecting the second activation and detecting the completion of the first operation; and means for taking one or more actions based at least in part on the operation duration time.

* * * * *